US007260571B2

(12) United States Patent
Amitay et al.

(10) Patent No.: US 7,260,571 B2
(45) Date of Patent: Aug. 21, 2007

(54) DISAMBIGUATION OF TERM OCCURRENCES

(75) Inventors: Einat Amitay, Kibbutz Shaar HaGolan (IL); Rani Nelken, Cambridge, MA (US); Niblack Wayne, San Jose, CA (US); David C Smith, Saratoga, CA (US); Aya Soffer, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/440,883

(22) Filed: May 19, 2003

(65) Prior Publication Data

US 2004/0236725 A1 Nov. 25, 2004

(51) Int. Cl.
*G06F 17/30* (2006.01)

(52) U.S. Cl. .................... 707/5; 707/3; 707/104.1; 715/513

(58) Field of Classification Search ............... 707/2–6, 707/104.1; 715/501.1, 513, 514, 760
See application file for complete search history.

(56) References Cited

U.S. PATENT DOCUMENTS

| 6,304,864 | B1 * | 10/2001 | Liddy et al. ................ 706/15 |
| 6,529,903 | B2 * | 3/2003 | Smith et al. ................ 707/7 |
| 6,651,057 | B1 * | 11/2003 | Jin et al. ................ 707/5 |
| 6,751,606 | B1 * | 6/2004 | Fries et al. ................ 707/3 |
| 7,085,709 | B2 * | 8/2006 | Panttaja ................ 704/9 |
| 7,085,771 | B2 * | 8/2006 | Chung et al. ................ 707/102 |
| 7,146,383 | B2 * | 12/2006 | Martin et al. ............ 707/104.1 |
| 2003/0163319 | A1 * | 8/2003 | Kemble et al. ............ 704/270 |
| 2004/0186827 | A1 * | 9/2004 | Anick et al. ................ 707/3 |
| 2005/0091211 | A1 * | 4/2005 | Vernau et al. ................ 707/6 |

OTHER PUBLICATIONS

Ide, Nancy et al., "Word Sense Disambiguation: The State of the Art," Computational Linguistics, 1998, 24(1), pp. 1-41.
Wacholder, Nina et al., "Disambiguation of Proper Names in Text," Fifth Conference on Applied Natural Language Processing (1997), pp. 202-208.
Mitra, Mandar et al., "Improving Automatic Query Expansion," Proceedings of the 21st Annual International ACM SIGIR Conference on Research and Development in Information Retrieval (1998), pp. 206-214.
Chakrabarti, Soumen, et al., "Focused Crawling: A New Approach to Topic-Specific Web Resource Discovery," © 1999 Published by Elsevier Science B.V., pp. 545-562.

* cited by examiner

*Primary Examiner*—Cheryl Lewis (57) ABSTRACT

A method for extracting information from a corpus of data includes specifying a topic and a query term associated with the topic, and defining adjunct terms which may occur in the corpus in a context of the query term, the adjunct terms comprising one or more off-topic terms. Occurrences of the query term are found in the corpus, the occurrences including at least one occurrence of the query term together with at least one of the off-topic terms in the context of the query term. The at least one occurrence of the query term is classified as non-relevant to the topic responsively to the occurrence of the at least one of the off-topic terms in the context of the query term.

65 Claims, 4 Drawing Sheets

DISAMBIGUATION OF TERM OCCURRENCES

FIELD OF THE INVENTION

The present invention relates generally to methods and systems for computerized information extraction from large bodies of data, and specifically to determining which occurrences of a query term that are found in a body of data are relevant to a topic of interest.

BACKGROUND OF THE INVENTION

In recent years, the importance of the World Wide Web as a primary knowledge source has continually increased. Due to its wide availability and distributed structure, the Web allows a large population of users to express various opinions on an unbounded range of topics and issues, such as people, companies, organizations and products. The easiest method of finding the set of mentions of a subject of interest is to use a search engine. This approach may be feasible for relatively rarely-occurring subjects, but it quickly becomes impractical for commonly-used subject names. Furthermore, due to the infamous ambiguity of natural language, many names and other query terms may have several meanings. Thus, the challenge of searching a large, heterogeneous corpus of data like the Web becomes not only to find all the subject occurrences, but also to select only those occurrences that have the desired meaning.

For example, consider the Ford Explorer™ SUV. It is of potentially significant commercial value for Ford Corporation to track what people are saying about their product on the Web. To be able to do so, it is necessary to first collect a large number of Web pages that refer to the product name. Popular Web pages may refer to the Ford Explorer colloquially as Explorer, and pages of this sort may be of particular interest to the manufacturer. Simply searching for the term "explorer" is problematic, however, since the term is both frequent and highly ambiguous. A Google™ search for Explorer yields over 13 million hits, which include Internet Explorer, MSN Explorer, Mars Explorer, MedExplorer, and many more. Clearly, even a highly-motivated user will not be able to process these results effectively without further automated filtering.

Various methods are known in the art for refining search results and eliminating irrelevant search hits. For example, word sense disambiguation (WSD) attempts to determine the different possible senses of relevant words in a text of interest, and then to assign each occurrence of a word to the appropriate sense. Methods of WSD are surveyed by Ide and Veronis in "Word Sense Disambiguation: The State of the Art," *Computational Linguistics* 24:1 (1998), pages 1-40, which is incorporated herein by reference. The specific problem of disambiguating proper names, such as Explorer, is addressed by Wacholder et al., in "Disambiguation of Proper Names in Text," *Fifth Conference on Applied Natural Language Processing* (1997), pages 202-208, which is also incorporated herein by reference.

As noted by Ide and Veronis, disambiguation is typically based on two major sources of information: the context of the word to be disambiguated, and external knowledge sources, such as dictionaries. For example, U.S. Pat. No. 5,541,836, to Church et al., whose disclosure is incorporated herein by reference, describes apparatus and methods for word disambiguation, based on determining whether a word/sense pair is proper for a context. Wide contexts (100 words) are used for both training and testing, and testing is done by adding the weights of vocabulary words from the context. This patent also discloses training techniques, including training using categories from Roget's Thesaurus.

Another method for enhancing search accuracy is query refinement, which adds terms to the original query provided by the user in order to give more precise search results. For example, Mitra et al. describe a method for adding query terms by blind feedback, without user input, in "Improving Automatic Query Expansion," *Proceedings of the 21st Annual International ACM SIGIR Conference on Research and Development in Information Retrieval* (1998), pages 206-214, which is incorporated herein by reference.

Focused Web crawling can be used as an adjunct to keyword searching, in order to find groups of Web pages that are connected by hyperlinks and are therefore likely to be related to a common domain. This sort of "goal-directed" crawling is described, for example, by Chakrabarti et al., in "Focused Crawling: A New Approach to Topic-Specific Web Resource Discovery," *Computer Networks* 31 (1999), pages 1623-1640, which is incorporated herein by reference. The focused crawler attempts to selectively seek out pages that are relevant to a predefined set of topics, which are typically specified using exemplary documents.

Other, related methods for document search, disambiguation and classification are described, for example, in U.S. Pat. Nos. 5,371,807; 5,873,056; and 6,038,560, whose disclosures are incorporated herein by reference.

SUMMARY OF THE INVENTION

Embodiments of the present invention provide improved methods and systems for disambiguating term occurrences in documents. The methods of the present invention are particularly useful in rapidly identifying the occurrences of a term that are relevant to a topic of interest in a large, noisy corpus of documents, such as the World Wide Web.

Embodiments of the present invention can be used not just to find relevant pages, in the manner of search engines and Web crawlers known in the art, but also to disambiguate individual occurrences of a particular term within a relevant page. For instance, returning to the example cited earlier, the methods of the present invention may be used not only to identify Web pages that discuss the Ford Explorer, but also to differentiate between actual mentions of the Explorer SUV on such pages and irrelevant term occurrences on the same page, such as "Best viewed with Internet Explorer." This aspect of the present invention is especially advantageous when large numbers of relevant references on a topic of interest must be collected for automated text mining analysis, such as giving the Ford Explorer product manager a broad picture of consumer feedback on the product.

In embodiments of the present invention, a user defines a set of query terms on a topic of interest. A set of adjunct terms is then defined and used in disambiguating occurrences of the query terms in a corpus of documents. Typically, the adjunct terms include both on-topic terms and off-topic terms. A search engine, or "spotter," searches the corpus for occurrences both of the query terms, referred to herein as "spots," and of the adjunct terms. A disambiguator classifies the occurrences of the spots as on-topic or off-topic (i.e., relevant or irrelevant to the topic of interest) depending on occurrences of the adjunct terms in the context of each spot. In other words, when an on-topic adjunct term occurs in the context of a given spot, the likelihood that the spot is on-topic increases, whereas this likelihood decreases when an off-topic term occurs in the context. The disambiguator considers both the on-topic and off-topic terms in deciding whether to classify each spot as on- or off-topic.

In some embodiments of the present invention, the disambiguator assesses multiple, nested context levels for each spot. Typically, the disambiguator considers both a local context and an extended context of the spot, wherein the extended context contains the local context. For example, when a spot occurs on a certain Web page, the disambiguator may consider both the relevance of the page as a whole (the extended context) to the topic of interest and the relevance of the particular paragraph or passage (the local context) for each spot on the page. More generally, any set of two or more context levels may be used, out of a context hierarchy ranging from a "window" of a certain number of words, to a sentence, a paragraph, a page or a group of linked documents. Thus, for example, a global context, containing the extended context, may be considered, as well, in addition to the local and extended contexts. Other choices of context levels and types will be apparent to those skilled in the art. The disambiguator typically computes a context score for each hierarchy level in the set, and then combines the scores, by weighted summing, for example, to determine an overall context score, which it uses in classifying the spots.

The adjunct terms used in disambiguating the spots may include both generic terms, of general relevance or irrelevance to the topic of interest, and specific terms, which bear on the relevance or irrelevance of particular query terms when the specific adjunct terms occur in the local context of these query terms.

In another aspect of the present invention, the disambiguator makes use of hyperlinks among the documents in the corpus as a further aid in classifying the spots as on- or off-topic. This feature of the invention is useful particularly when the spotter and disambiguator operate on a set of pages that were collected by a Web crawler. When the hyperlinks that point to a given page containing a spot originate on other pages that have been classified as off-topic (because they contain off-topic adjunct terms, for example), the disambiguator may conclude that the given page is off-topic, as well.

Although the embodiments described herein are directed to searching the Web and processing Web pages, the principles of the present invention may similarly be applied to locating and classifying references to terms of interest in data sets of other types, as well.

There is therefore provided, in accordance with an embodiment of the present invention, a method for extracting information from a corpus of data, including:

specifying a topic and a query term associated with the topic;

defining adjunct terms which may occur in the corpus in a context of the query term, the adjunct terms including one or more off-topic terms;

finding in the corpus occurrences of the query term, the occurrences including at least one occurrence of the query term together with at least one of the off-topic terms in the context of the query term; and classifying the at least one occurrence of the query term as non-relevant to the topic responsively to the occurrence of the at least one of the off-topic terms in the context of the query term.

Typically, each of the adjunct terms belongs to a term type selected from a group of term types consisting of words, phrases and lexical affinities.

In embodiments of the invention, the adjunct terms further include one or more on-topic terms, and finding the occurrences of the query term includes finding at least one of the adjunct terms in the context of each of at least some of the occurrences of the query term, and classifying the at least one occurrence of the query term includes classifying each of the at least some of the occurrences of the query term as relevant or non-relevant to the topic responsively to the adjunct terms found in the context of the query term.

In one embodiment, specifying the query term includes specifying multiple query terms associated with the topic, and defining the adjunct terms includes defining a generic adjunct term, for use in classifying the occurrences of any of the query terms as relevant or non-relevant to the topic, and defining a specific adjunct term, for use in classifying the occurrences of a first query term but not a second query term among the multiple query terms as relevant or non-relevant to the topic.

In another embodiment, classifying each of the at least some of the occurrences of the query term includes computing a score based on the occurrences of the on-topic and off-topic terms in the context of the query term, and comparing the score to a threshold, wherein defining the adjunct terms includes assigning a weight to each of the adjunct terms, such that the on-topic and off-topic terms receive respective weights of opposite sign, and wherein computing the score includes summing the weights of the adjunct terms occurring in the context.

In yet another embodiment, defining the adjunct terms includes defining at least one of the on-topic terms as an always-on term, such that when the always-on term is found in the context of one of the occurrences of the query term, the one of the occurrences is classified as relevant to the topic irrespective of finding any of the off-topic terms in the context. Additionally or alternatively, defining the adjunct terms includes defining at least one of the off-topic terms as an always-off term, such that when the always-off term is found in the context of one of the occurrences of the query term, the one of the occurrences is classified as non-relevant to the topic irrespective of finding any of the on-topic terms in the context.

Typically, defining the adjunct terms includes at least one of receiving a list of the adjunct terms from a user, and processing the corpus to find one or more documents of relevance to the topic, and analyzing the one or more documents to extract the adjunct terms therefrom.

In an aspect of the invention, the corpus of data includes a collection of documents, which are interconnected by hyperlinks, and wherein finding the occurrences of the query term includes crawling over the hyperlinks to assemble a set of the documents, and searching the set to find the occurrences.

There is also provided, in accordance with an embodiment of the present invention, a method for extracting information from a corpus of data, including:

specifying a topic and a query term associated with the topic;

finding in the corpus a first document containing an occurrence of the query term;

identifying in the corpus one or more second documents containing hyperlinks leading to the first document;

evaluating the one or more second documents to determine whether the second documents are relevant or non-relevant to the topic; and responsively to determining that the one or more second documents are non-relevant to the topic, classifying the occurrence of the query term in the first document as non-relevant to the topic.

Typically, finding the first document and the one or more second documents includes crawling over the hyperlinks in order to assemble a set of the documents in the corpus that are related to the topic, wherein the documents include Web pages, and wherein crawling over the hyperlinks includes collecting the Web pages from multiple computers over a network.

There is additionally provided, in accordance with an embodiment of the present invention, a method for extracting information from a corpus of data, including:

specifying a topic and a query term associated with the topic;

finding in the corpus an occurrence of the query term;

evaluating an extended context of the occurrence of the query term in order to determine a first measure of relevance of the occurrence of the query term to the topic;

evaluating a local context of the occurrence of the query term, such that the local context is contained within the extended context, in order to determine a second measure of the relevance of the occurrence of the query term to the topic; and classifying the occurrence of the query term as relevant or non-relevant to the topic responsively to the first and second measures.

In an aspect of the invention, the method includes defining adjunct terms that may occur in the corpus in proximity to the query term, wherein evaluating the extended context includes identifying a first set of the adjunct terms occurring in the extended context of the occurrence of the query term, and determining the first measure based on the first set, and wherein evaluating the local context includes identifying a second set of the adjunct terms occurring in the local context of the occurrence of the query term, and determining the second measure based on the second set.

In a disclosed embodiment, evaluating the extended context includes computing a first score based on the first set of the adjunct terms, wherein evaluating the local context includes computing a second score based on the second set of the adjunct terms, and wherein classifying the occurrence includes comparing the first and second scores to a threshold. Typically, comparing the first and second scores includes comparing a weighted sum of the first and second scores to the threshold.

In one embodiment, the extended context includes a page of a document in the corpus, and wherein the local context includes a passage of text within the page.

In a further embodiment, the method includes evaluating a global context of the occurrence of the query term in order to determine a third measure of the relevance of the occurrence of the query term to the topic, such that the extended context is contained within the global context, wherein classifying the occurrence includes classifying the occurrence of the query term responsively to the third measure, together with the first and second measures.

There is further provided, in accordance with an embodiment of the present invention, a method for extracting information from a corpus of data, including:

specifying a topic and multiple query terms associated with the topic, including at least first and second query terms;

defining adjunct terms which may occur in the corpus in a context of one or more of the query terms, the adjunct terms including:

one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic;

finding in the corpus occurrences of the query terms, the occurrences including at least one occurrence of one of the query terms together with at least one of the adjunct terms in the context of the one of the query terms; and classifying the at least one occurrence as relevant or non-relevant to the topic responsively to the occurrence of the at least one of the adjunct terms in the context of the one of the query terms.

In a disclosed embodiment, classifying the at least one occurrence includes computing a score based on the occurrence of at least one of the generic adjunct terms in the context of either of the first and second query term, and comparing the score to a threshold. Typically, computing the score includes computing a first score based further on the occurrence of at least one of the specific adjunct terms in the context of the first query term, while ignoring the occurrence of the specific adjunct terms in computing a second score with respect to the second query term.

There is moreover provided, in accordance with an embodiment of the present invention, apparatus for extracting information from a corpus of data for information relevant to a topic, using a specified query term associated with the topic, the apparatus including:

a memory, which is arranged to store at least a portion of the corpus and a set of adjunct terms which may occur in the corpus in a context of the query term, the adjunct terms including one or more off-topic terms; and a data mining processor, which is arranged to search the memory in order to find occurrences of the query term, the occurrences including at least one occurrence of the query term together with at least one of the off-topic terms in the context of the query term, and to classify the at least one occurrence of the query term as non-relevant to the topic responsively to the occurrence of the at least one of the off-topic terms in the context of the query term.

There is furthermore provided, in accordance with an embodiment of the present invention, apparatus for extracting information from a corpus of data for information relevant to a topic, using a specified query term associated with the topic, the apparatus including:

a memory, which is arranged to store at least a portion of the corpus; and a data mining processor, which is arranged to search the memory in order to find in the corpus a first document containing an occurrence of the query term, and to identify in the corpus one or more second documents containing hyperlinks leading to the first document, the processor being further arranged to evaluate the one or more second documents to determine whether the second documents are relevant or non-relevant to the topic, and responsively to determining that the one or more second documents are non-relevant to the topic, to classify the occurrence of the query term in the first document as non-relevant to the topic.

There is also provided, in accordance with an embodiment of the present invention, apparatus for extracting information from a corpus of data for information relevant to a topic, using a specified query term associated with the topic, the apparatus including:

a memory, which is arranged to store at least a portion of the corpus; and a data mining processor, which is arranged to search the memory in order to find in the corpus an occurrence of the query term, and which is further arranged to evaluate an extended context of the occurrence of the query term in order to determine a first measure of relevance of the occurrence of the query term to the topic, and to evaluate a local context of the occurrence of the query term, such that the local context is contained within the extended context, in order to determine a second measure of the relevance of the occurrence of the query term to the topic, and to classify the occurrence of the query term as relevant or non-relevant to the topic responsively to the first and second measures.

There is additionally provided, in accordance with an embodiment of the present invention, apparatus for extracting information from a corpus of data for information relevant to a topic, using specified query terms associated with the topic, including at least first and second query terms, the apparatus including:

a memory, which is arranged to store at least a portion of the corpus and a set of adjunct terms which may occur in the corpus in a context of one or more of the query terms, the adjunct terms including:

one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic; and a data mining processor, which is arranged to search the memory in order to find occurrences of the query terms, the occurrences including at least one occurrence of one of the query terms together with at least one of the adjunct terms in the context of the one of the query terms, and to classify the at least one occurrence as relevant or non-relevant to the topic responsively to the occurrence of the at least one of the adjunct terms in the context of the one of the query terms.

There is further provided, in accordance with an embodiment of the present invention, a computer software product for extracting information from a corpus of data for information relevant to a topic, using a specified query term associated with the topic, the product including a computer-readable medium in which program instructions are stored, which instructions, when read by a computer, cause the computer to receive a set of adjunct terms which may occur in the corpus in a context of the query term, the adjunct terms including one or more off-topic terms, and to search the data in order to find occurrences of the query term, the occurrences including at least one occurrence of the query term together with at least one of the off-topic terms in the context of the query term, and to classify the at least one occurrence of the query term as non-relevant to the topic responsively to the occurrence of the at least one of the off-topic terms in the context of the query term.

There is moreover provided, in accordance with an embodiment of the present invention, a computer software product for extracting information from a corpus of data for information relevant to a topic, using a specified query term associated with the topic, the product including a computer-readable medium in which program instructions are stored, which instructions, when read by a computer, cause the computer to search the data in order to find in the corpus a first document containing an occurrence of the query term, and to identify in the corpus one or more second documents containing hyperlinks leading to the first document, the instructions further causing the computer to evaluate the one or more second documents to determine whether the second documents are relevant or non-relevant to the topic, and responsively to determining that the one or more second documents are non-relevant to the topic, to classify the occurrence of the query term in the first document as non-relevant to the topic.

There is furthermore provided, in accordance with an embodiment of the present invention, a computer software product for extracting information from a corpus of data for information relevant to a topic, using a specified query term associated with the topic, the product including a computer-readable medium in which program instructions are stored, which instructions, when read by a computer, cause the computer to search the data in order to find in the corpus an occurrence of the query term, and further cause the computer to evaluate an extended context of the occurrence of the query term in order to determine a first measure of relevance of the occurrence of the query term to the topic, and to evaluate a local context of the occurrence of the query term, such that the local context is contained within the extended context, in order to determine a second measure of the relevance of the occurrence of the query term to the topic, and to classify the occurrence of the query term as relevant or non-relevant to the topic responsively to the first and second measures.

There is also provided, in accordance with an embodiment of the present invention, a computer software product for extracting information from a corpus of data for information relevant to a topic, using a specified query term associated with the topic, the product including a computer-readable medium in which program instructions are stored, which instructions, when read by a computer, cause the computer to search the data in order to find in the corpus a first document containing an occurrence of the query term, and to identify in the corpus one or more second documents containing hyperlinks leading to the first document, the instructions further causing the computer to evaluate the one or more second documents to determine whether the second documents are relevant or non-relevant to the topic, and responsively to determining that the one or more second documents are non-relevant to the topic, to classify the occurrence of the query term in the first document as non-relevant to the topic.

There is additionally provided, in accordance with an embodiment of the present invention, a computer software product for extracting information from a corpus of data for information relevant to a topic, using specified query terms associated with the topic, including at least first and second query terms, the product including a computer-readable medium in which program instructions are stored, which instructions, when read by a computer, cause the computer to receive a set of adjunct terms which may occur in the corpus in a context of one or more of the query terms, the adjunct terms including:

one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic, wherein the instructions further cause the computer to search the memory in order to find occurrences of the query terms, the occurrences including at least one occurrence of one of the query terms together with at least one of the adjunct terms in the context of the one of the query terms, and to classify the at least one occurrence as relevant or non-relevant to the topic responsively to the occurrence of the at least one of the adjunct terms in the context of the one of the query terms.

The present invention will be more fully understood from the following detailed description of the embodiments thereof, taken together with the drawings in which:

DETAILED DESCRIPTION OF EMBODIMENTS

Figure 1:
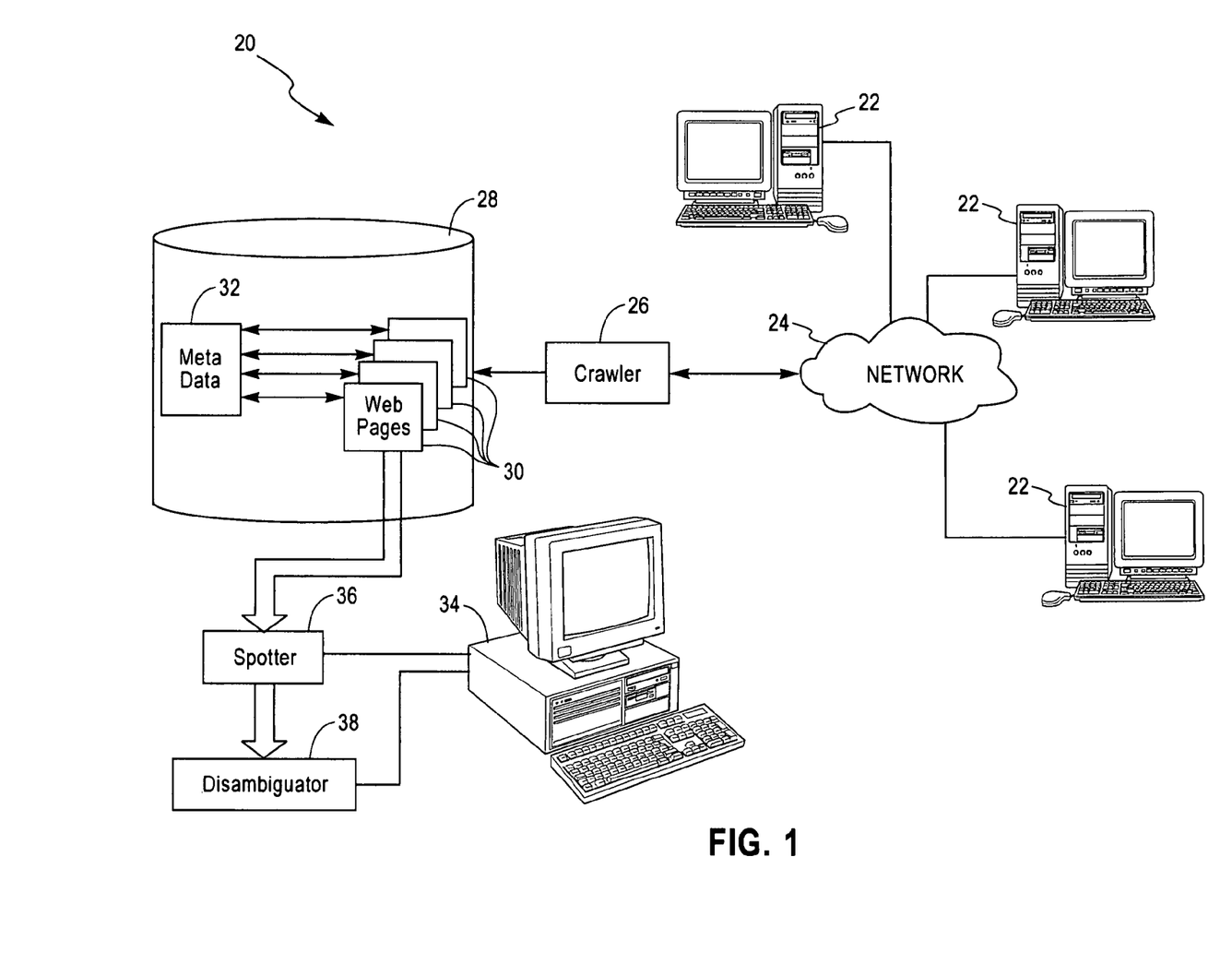
FIG. 1 is a schematic, partly pictorial illustration of a system for extracting information from a corpus of documents, in accordance with an embodiment of the present invention.

FIG. 1 is a schematic, partly pictorial illustration of a system 20 for extracting information from a corpus of documents, in accordance with an embodiment of the present invention. In this embodiment, the documents to be processed are distributed on multiple computers 22, which are connected by a network 24. Typically, computers 22 support Web sites, and network 24 comprises the Internet, although the methods described hereinbelow may similarly be applied to other distributed corpora of documents.

A Web crawler 26 collects Web pages 30 that may be relevant to a topic of interest, and stores the Web pages in a memory 28, such as a disk repository. Crawler 26 may comprise, for example, the IBM WebFountain crawler, as described by Edwards et al. in "An Adaptive Model for Optimizing Performance of an Incremental Web Crawler," *Proceedings of the* 10*th International World Wide Web Conference* (WWW10-2001), pages 106-113, which is incorporated by reference. Alternatively, other Web crawlers, as are known in the art, may be used in system 20. The crawling may be focused in order to collect Web pages having a relatively high probability of being relevant to the topic of interest. Memory 28 holds both pages 30 and metadata 32, containing annotations of the data in pages 30.

A data mining processor 34 processes pages 30 in order to identify occurrences of query terms, or "spots," that are relevant to a topic of interest, while rejecting off-topic occurrences of these terms. Typically, processor 34 comprises a general-purpose computer, which is programmed in software to carry out the methods described hereinbelow. The software may be supplied to processor 34 in electronic form, over a network link, for example, or it may alternatively be provided on tangible media, such as optical, magnetic or non-volatile electronic storage media.

The operation of processor 34 is based on two functional modules: a spotter 36 and a disambiguator 38. These modules are typically implemented as loosely-coupled software components, which sequentially traverse pages 30. The spotter scans the data in the pages in order to find and tag occurrences of the spots and of adjunct terms, which are used in identifying on- and off-topic occurrences of the spots. The disambiguator then reviews and scores each of the spots tagged by the spotter, based on the tagged adjunct terms occurring in local and extended contexts of the spots. Based on these scores, and optionally, on a number of additional heuristic rules, the disambiguator classifies each spot as either on- or off-topic. The pages and/or passages containing on-topic spots are then returned to the user or passed on for further processing, such as data mining analysis. The operation of spotter 36 and disambiguator 38 is described in further detail with reference to the figures that follow.

Figure 2:
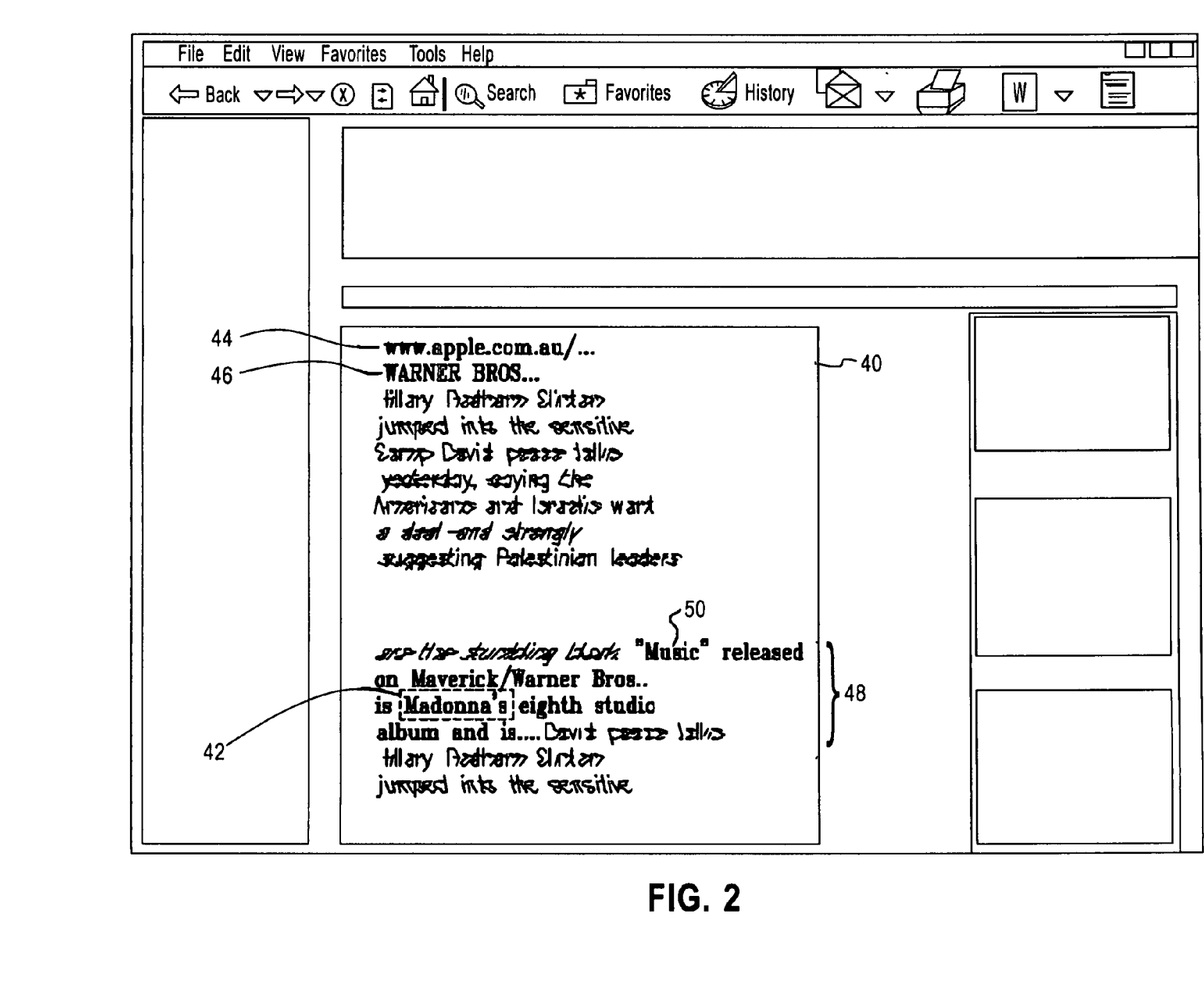
FIG. 2 is a schematic representation of a document found on the Web, which is processed to identify relevant occurrences of a query term, in accordance with an embodiment of the present invention.

FIG. 2 is a schematic representation of a typical document, which is processed by processor 34 in accordance with an embodiment of the present invention. In this example, processor 34 has been instructed by a user to find information about the singer Madonna. For this purpose, spotter 36 scans the documents (Web pages 30) in memory 28 for occurrences (referred to as spots) of the query term "Madonna," and tags each occurrence. A spot 42 is thus found on a Web page 40, which is identified by its URL 44 and a title 46.

Spotter 36 also scans page 40 for predefined adjunct terms, including both on-topic and off-topic terms. When one of the on-topic terms occurs in a context of spot 42, such as a term 50 "Music," which appears in a paragraph 48 containing the spot, it increases the likelihood that this spot is on-topic. The word "album" appearing in paragraph 48 could also be tagged as an on-topic term. On the other hand, if an off-topic term, such as "Jesus," were to appear in the context of the spot "Madonna," it would tend to indicate that that this spot refers to the Madonna of Christian tradition and is therefore off-topic.

The adjunct terms may be defined manually by the user or automatically by processor 34, or by a combination of manual and automated methods, as described below. These adjunct terms may be of various types, such as words, phrases and lexical affinities. A lexical affinity is a combination of other terms—words or phrases—occurring within a predefined distance of one another in the text. Thus, for example, the lexical affinity "Madonna*fan" refers to occurrence of the terms "Madonna" and "fan" no more than a certain number of words apart in the text. The distance limit for all lexical affinities may be set to a certain default value (typically 5 words), or it may be set individually for each lexical affinity.

After spotter 36 has tagged spots and terms on page 40, disambiguator 38 evaluates each spot to determine whether it is on- or off-topic. The disambiguator typically considers multiple, nested context levels, including both a local context and an extended context of each spot. In the example shown in FIG. 2, the extended context is all of page 40, while the local context is paragraph 48, in which spot 42 occurs. Alternatively, larger or smaller extended and local contexts may be used, and disambiguator 38 may consider three or more different context levels. For example, the local context may be a sentence or phrase containing spot 42, of a "window" of a certain size surrounding the spot, such as a window spanning ten words in each direction. The extended context may be as small as a paragraph or may comprise several pages or an entire Web site. The use of both local and extended contexts allows the disambiguator to work at the granularity level of a single spot, while also taking into account information that appears elsewhere in the page. The disambiguator may thus determine that a particular spot is on-topic based primarily on the local context even if the extended context contains little or no supporting evidence, or vice versa.

Disambiguator 38 preferably makes a binary classification of every spot as either on- or off-topic, and may even classify one spot on a given page as on-topic, and another as off-topic. For instance, in the "Ford Explorer" example given in the Background of the Invention, the disambiguator may distinguish on a Web page between on-topic spots referring to the Explorer SUV and off-topic spots, such as "Best viewed with Internet Explorer." Processor 34 thus differs from search engines known in the art, which return only lists of pages containing the query term in question, while ranking the relevance of the page as a whole.

Figure 3A:
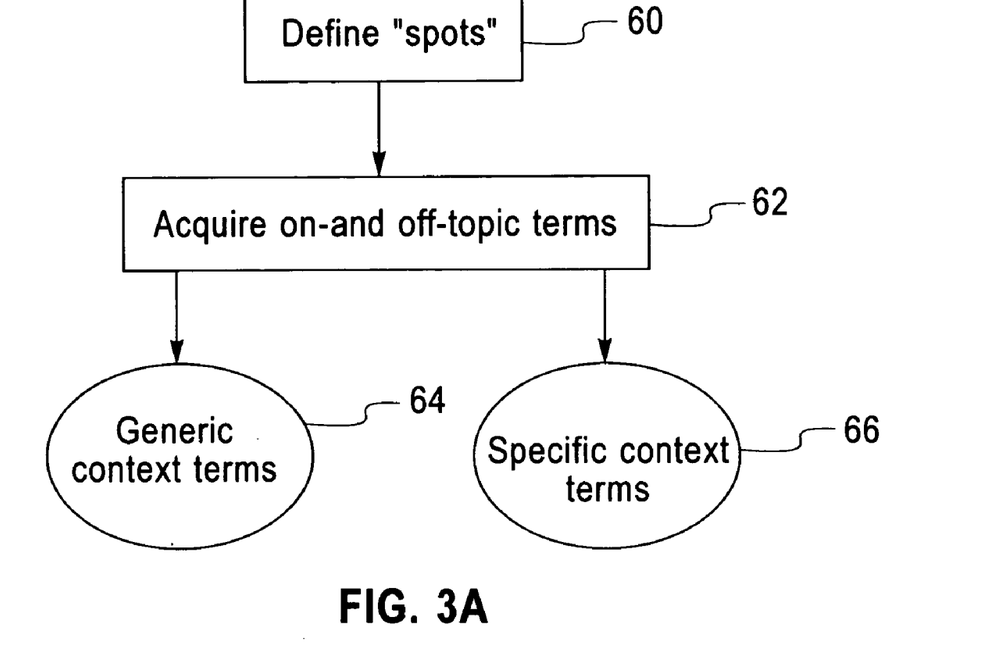
FIG. 3A is a flow chart that schematically illustrates a method for defining and collecting terms for use in disambiguating term occurrences, in accordance with an embodiment of the present invention.

FIG. 3A is a flow chart that schematically illustrates a method for defining and collecting terms for use in locating and disambiguating text passages of interest on pages 30, in accordance with an embodiment of the present invention. A user of processor 34 initiates this process by defining a topic of interest and a set of one or more query terms on the topic, at a spot definition step 60. In the example given above, the query term "Madonna" was chosen. The user may also choose to search for Madonna's real name, Louise Veronica Ciccone, as well as other variations on subject names and terms.

Processor 34 next acquires a set of adjunct on-topic and off-topic terms, at a term acquisition step 62, for use in disambiguating the spots to be found by spotter 36. The inventors have used both automated and manual methods to collect these adjunct terms, including the following:

1. Manual set-up: On- and off-topic terms are input by the user.

For example, the user may initiate a search for the term "Madonna," which returns both the Web page shown in FIG. 2 and another Web page containing the off-topic passage shown below in Table I:

TABLE I

OFF-TOPIC SPOT

| | |
|---|---|
| URL | www.tnr.com/100900/soskis100900.html |
| Title | TNR Online \| A Tale of Two Cities by Benjamin Soskis |
| Subject | Madonna |
| Context | Even so, in July, according to one poll, 70 percent of Pennsylvanians still hadn't heard of him. Says G. Terry Madonna, a pollster from Millersville University: "This race is about Santorum, who is the incumbent, and Klink has not made a case that Santorum is unworthy of reelection, because he hasn't had the money." |

Based on the passage shown in FIG. 2, the user may define "music" and "album" as on-topic terms, while defining "university" and "terry*madonna" as off-topic terms, based on the passage in Table I. To improve the accuracy and efficiency of this procedure, an iterative method may be used, in which the user first inputs a set of terms, initiates a mining process, evaluates partial results, and reiterates, after modifying the set of terms, until results are satisfactory. The number of iterations that is likely to be needed depends on several factors, including the level of complexity of the data set and the level of accuracy desired. This iterative setup procedure is also useful in refining sets of terms acquired using the automated methods described below.

2. Automatically extracting terms from domain-related Web-pages.

In this procedure, a set of Web pages related to the topic of interest is created, and is then profiled automatically to extract frequently-occurring terms (including phrases and lexical affinities). The rationale is that terms that occur frequently in Web pages belonging to the topic of interest are likely to be indicative of the domain as a whole. For example, the Open Directory Project (ODP) provides a human-edited directory of Web pages at www.dmoz.org, including directory entries that may correspond to the topic of interest and may thus be analyzed to automatically extract adjunct terms.

As another alternative, a system of Knowledge Agents (KA) may be used to obtain a collection of domain-related pages. Such a system is described, for example, in U.S. patent application Ser. No. 09/610,705, U.S. Pat. No. 6,636,848 filed Jul. 6, 2000, which is assigned to the assignee of the present patent application, and whose disclosure is incorporated herein by reference. The KA system allows users to semi-automatically define domains of interest and focus search results on those particular domains.

To summarize this approach briefly: the user gives the KA system a set of textual queries, plus optionally a set of sample URLs. The queries are submitted to a Web search engine, and the set of search results plus sample URLs are expanded by following forward and backward links to create a set of representative pages for the domain of interest. Pages are scored using a combination of a link-based score and a text-based score. From the set of representative pages, the KA extracts representative terms, typically the terms having the top tf*idf scores. (The tf*idf score, representing the term frequency [tf] times the inverse document frequency [idf], as is known in the art, compares the frequency of occurrence of a given term in the representative pages to its frequency of occurrence in the data set as a whole.) From the generated lists of terms, the KA system automatically prunes a set of stop-words, as well as the query terms themselves, in order to generate a list of adjunct terms. The inventors have found this approach most useful in defining on-topic lexical affinities, but less useful in finding terms of other types.

3. Supervised learning of terms.

In this method, spotter 36 searches a collection of pages 30 and produces a table of the spots it has found. Rather than using disambiguator 38 to decide whether the spots are on- or off-topic, the user manually marks the on- and off-topic spots. Processor 34 uses this training data to automatically learn on- and off-topic terms by profiling the local contexts of the spots marked by the user, extracting frequently occurring terms from these contexts, and removing any stop words. The top terms learned from the on-topic contexts are recorded as on-topic terms, while the top terms from the off-topic contexts as off-topic terms.

Table II below lists some exemplary adjunct terms found by the alternative methods described above. As noted above, lexical affinities are represented by their component words, separated by "*". These methods are described here by way of example, and other methods for defining on- and off-topic adjunct terms will be apparent to those skilled in the art.

TABLE II

ON- AND OFF-TOPIC TERMS

| Method | On-topic terms | Off-topic terms |
|---|---|---|
| Manual | guy ritchie, like a virgin, veronica, ciccone, die*day, louise, veronica, ciccone, michael | jesus, hospital, university, terry*madonna |

TABLE II-continued

ON- AND OFF-TOPIC TERMS

| Method | On-topic terms | Off-topic terms |
|---|---|---|
| KA | jackson, britney spears, evita, music, erotica, who's that girl, music, pap, groove, dick tracy madonna*fan, madonna*song, madonna*lyric, evita*madonna, light*ray, fan*site, size*type, bon*jovi, britney*spears, michael*jackson, rolling*stone, musical*single | |
| Supervised | music*review, exclusive, video, ciccone, vocal, album*music, girl*gives, album*rate, album*review, music* review, live*tv, ritchie, girl*material, song, awards, tickets, entertainment*news | church*doors, grieving, vasaris, altar, jesus, calabria*traveler, church*doors, marble, procession |

Thus, upon the conclusion of step 62, processor 34 has on hand a set of adjunct terms, which may include both generic context terms 64 and specific context terms 66. Generic context terms are those adjunct terms whose occurrence in the context of any spot tends to identify the spot as on- or off-topic. On the other hand, when multiple query terms are used (such as "Madonna" and "Ciccone," in the example cited above), the specific context terms are relevant only to spots of a particular query term, but not of others. For example, the off-topic adjunct term "Jesus" might be specific to the query term "Madonna," but might carry no weight when it occurs in the context of "Ciccone."

Each of the adjunct terms (generic or specific) receives a weight, to be used subsequently by disambiguator 38 in classifying on- and off-topic spots. For a given term t, the weight $W_t$ depends on two factors: The sign of the weight is positive or negative, depending on whether the term t is on-topic or off-topic, respectively. The absolute value of the weight depends on whether the term is a single word, a longer phrase or a lexical affinity, wherein phrases and lexical affinities are typically assigned a higher value, to increase their relative contribution. Alternatively or additionally, other analytical and empirical factors may be taken into account in the weighting, and different weights may be given to generic and specific context terms. Certain adjunct terms may be empirically given "infinite" weights, so that the occurrence of such a term in a context of a given spot means that the spot is always considered to be on- or off-topic, regardless of what other adjunct terms are also found in the context. For example, the phrase "Guy Ritchie" occurring in the context of "Madonna" may be weighted as "always on." Similarly, the query term "Louise Veronica Ciccone" may also be considered "always on," irrespective of any off-topic adjunct terms in its context.

Figure 3B:
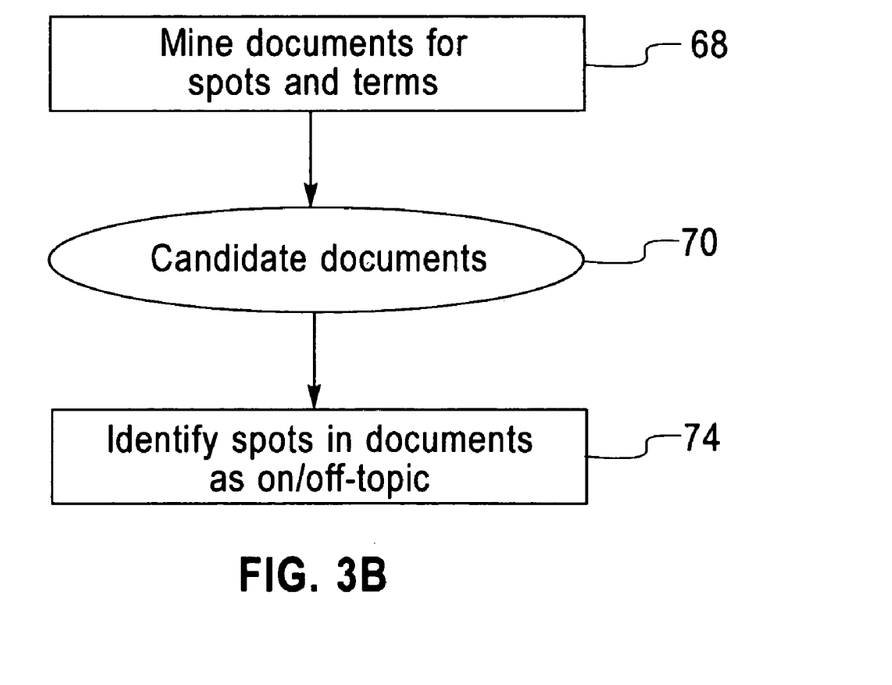
FIG. 3B is a flow chart that schematically illustrates a method for finding and disambiguating term occurrences in a corpus of documents, in accordance with an embodiment of the present invention.

FIG. 3B is a flow chart that schematically illustrates a method for finding and disambiguating spots in pages 30, in accordance with an embodiment of the present invention. After the query terms and adjunct terms have been defined, preferably according to the method of FIG. 3A, spotter 36 mines pages 30 in order to tag occurrences of the terms, at a mining step 68. Spotter 36 allows flexibility as to the exact form of the terms along several dimensions, each separately configurable per term, such as case-insensitivity, plurals, possessives, and stop words. When these options are turned on, the spotter will locate and tag terms even when they appear with these variations, i.e., in lower or upper case, with plural or possessive suffixes and with or without stop words. The pages 30 on which spots are found by spotter 36 define a set of candidate pages 70, for analysis by disambiguator 38.

Disambiguator 38 next examines the terms that have been tagged in the candidate documents, in order to identify the spots as on- or off-topic, at a spot classification step 74. At this stage, certain of the candidate documents may themselves be classified as off-topic, as described below with reference to FIG. 4, so that further consideration of the individual tagged spots is not necessary. In the other candidate documents, disambiguator 38 scans the tagged spots and adjunct terms in the remaining documents. All spots are scored on the basis of the weights of the adjunct terms in the extended and local contexts of the spots, as described below. The scores are then combined, typically by weighted summing, and the combined score is compared to a threshold. Spots whose scores are above the applicable threshold are classified as on-topic. The remaining spots are classified as off-topic, including spots in whose context spotter 36 found no adjunct terms. When the disambiguator has finished reviewing the candidate documents, processor 34 outputs a listing of the on-topic spots for review by the user, or for use as input to further text analysis.

Figure 4:
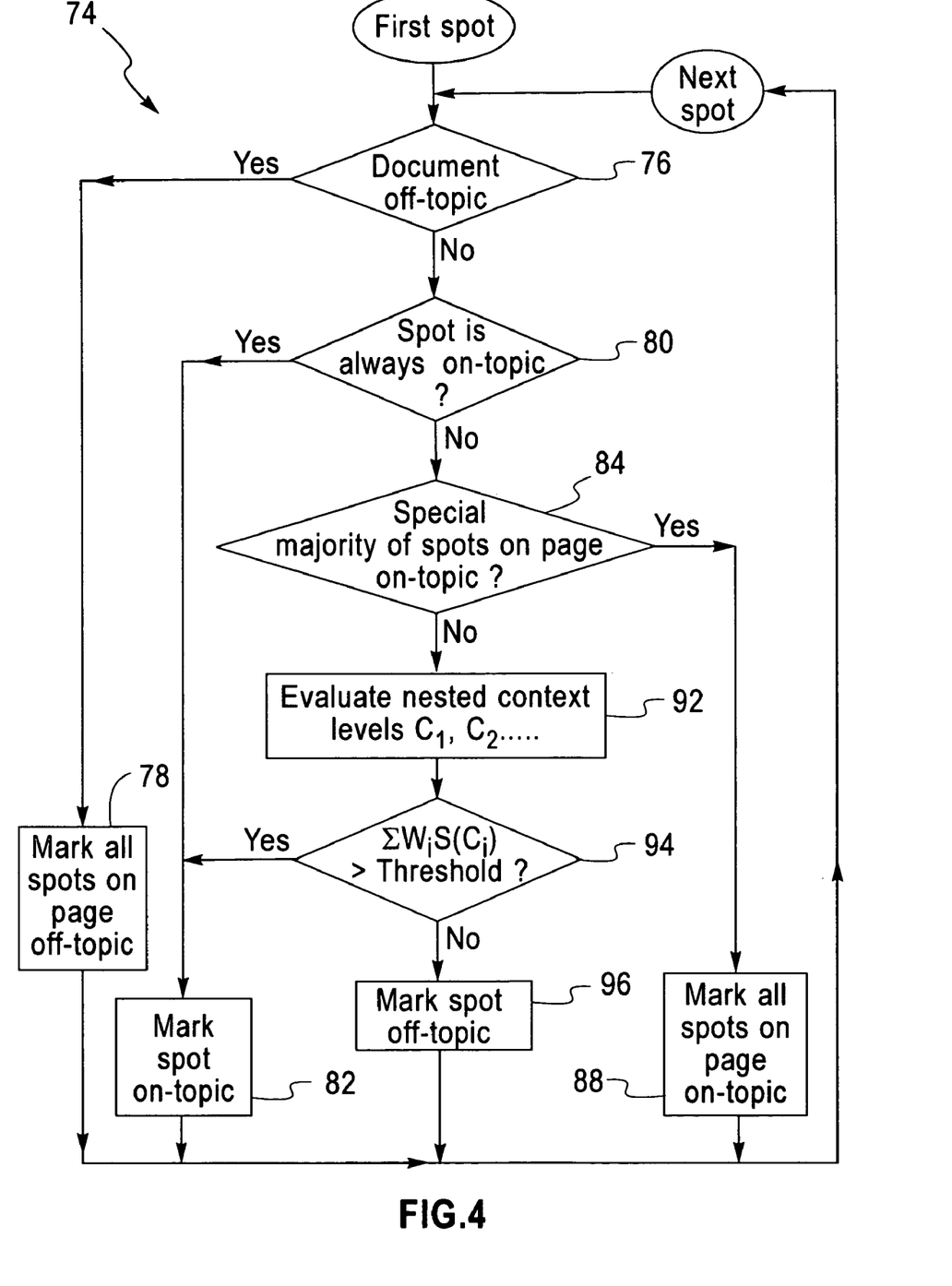
FIG. 4 is a flow chart that schematically illustrates a method for classifying occurrences of a query term, in accordance with an embodiment of the present invention.

FIG. 4 is a flow chart that schematically shows details of disambiguation step 74, in accordance with an embodiment of the present invention. The process shown in FIG. 4 is applied to each of the spots on each candidate page (except those eliminated at step 72). For each spot, disambiguator 38 may first check the overall relevance of the document on which the spot appears, at an off-topic document elimination step 76. This step is optional, but helps to reduce the workload of the disambiguator and to reduce the number of marginally-relevant spots that are output at the end of the disambiguation process. The inventors have found that when all the hyperlinks pointing to a given candidate page 30 originate from other pages that are off-topic, there is a high likelihood that the given candidate page is off-topic, as well. Therefore, at step 76, the disambiguator typically examines metadata 32 to determine which other pages in memory 28 contain hyperlinks that point to the current candidate page. It then checks to ascertain whether these other pages were already evaluated and found to be off-topic. If so, the current candidate page is marked as off-topic, as well, at an off-topic page marking step 78. Other criteria may likewise be used to eliminate off-topic documents and thus reduce the candidate set. On the other hand, if the links pointing to a candidate page all originate from pages that have been found to be on-topic, the disambiguator may classify the spots on the candidate page without further analysis.

Disambiguator 38 next checks the query term appearing in the spot to determine whether this query term is considered to be "always on-topic," at an always-on checking step 80. In the example noted above, "Louise Veronica Ciccone" was considered to be such a term. In this case, disambiguator 38 marks the spot as on-topic, at an on-topic marking step 82, without further examining the context.

If disambiguator 38 has already evaluated the local context of other spots on the same page as the current spot, the disambiguator may decide on the disposition of the current spot based on these other spots, at a majority ruling step 84. If a large majority of all the spots on the page, typically at least two thirds of the spots, have already been determined to be on-topic, then all the remaining spots on the page are marked as on-topic, at an on-topic page marking step 88. No further checking of the individual spots is required. (By the same token, if a large majority of all the spots have been determined to be off-topic, all the remaining spots are marked as off-topic.) This heuristic is typically applied to pages that contain a large number of spots. In such cases, it is usually fair to assume that if a large majority of the spots are classified in one direction, then the rest of spots should also be classified in the same way.

For all other spots, disambiguator 38 proceeds to evaluate the nested contexts of the spot, $C_1, C_2, \ldots$, at a context evaluation step 92. Typically, a single local context ($C_1$) and a single extended context ($C_2$), containing the local context, are used at this step, although a larger number of context levels may be used. For each context level i, the disambiguator computes a level context score, $S(C_i)$. (As noted above, always-on and always-off adjunct terms have effectively infinite weights. Therefore, when the extended context includes one of these always-on or always-off terms, the disambiguator may classify all the spots on the page as on- or off-topic, while bypassing the remaining score computation.)

The level context score for context level i is typically given by:

$$S(C_i) = \sum_{t \in C_i} W_t \cdot tf_t \cdot idf_t \quad (1)$$

The elements of this expression are computed as follows:

$W_t$ is the weight of each term t, as defined above, with a positive weight for on-topic terms and a negative weight for off-topic terms. Generic and specific adjunct terms, as defined above, may be given different weights in this computation.

$tf_t$ reflects the term frequency of each adjunct term t occurring in $C_i$. Typically, $tf_t$ is computed using the formula $tf_t = \sqrt{N_t}$, wherein $N_t$ denotes the number of occurrences of the term t found by the disambiguator in the context in question. The rationale for using the square root in this formula is that the occurrence of multiple different adjunct terms within a context is more significant than the same number of occurrences of a single term.

$idf_t$ is the inverse document frequency, reflecting the overall frequency of each adjunct term t in the entire corpus of documents, for example, in all pages available on the Web. (The more frequent the term overall, the smaller the value of $idf_t$.) The value of $idf_t$ may be determined independently by processor 34, or it may be based on other compiled statistics, such as TREC Web-Track data, which is available at trec.nist.gov. For the sake of simplicity, the actual values of $idf_t$ may be computed for single words only. (Frequency information for phrases and lexical affinities on the Web is generally unavailable and is difficult to compute.) Terms that do not have approximate $idf_t$ values available (including phrases and lexical affinities) may be given a default value representing a small number of occurrences.

Based on the different level context scores found at step 92, an overall score is computed and compared to a predetermined threshold, at a threshold checking step 94. The overall score is a weighted sum (or equivalently, a weighted average) of the individual level context scores:

$$S_{TOTAL} = \sum_i W_i \cdot S(C_i) \quad (2)$$

Other factors may be added into $S_{TOTAL}$, as well. For example, a factor may be added to reflect the existence of links to the current document from other on-topic documents. If the weighted sum is greater than the threshold, the disambiguator marks the current spot as on-topic, at step 82. The weighting factors $W_i$ may be chosen so as to emphasize a particular context level (so that, for example, a high extended context score will cause all spots in the extended context to be marked as on-topic). Alternatively, all the weighting factors may be equal, to that equation (2) reduces to a simple sum. Otherwise, if the weighted sum is below the threshold, the current spot is marked as off-topic, at an off-topic marking step 96. The disambiguator then proceeds to the next spot marked by the spotter, until all spots have been scanned and marked.

Although processor 34 and system 20 have been described hereinabove with reference to searching the Web and processing Web pages, the principles embodied in these elements may similarly be applied to locating and classifying references to terms and topics of interest in documents of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for extracting information from a corpus of data, comprising:
   specifying a topic and a query term associated with the topic;
   defining adjunct terms which may occur in the corpus in a context of the query term, the adjunct terms comprising one or more off-topic terms;
   finding in the corpus occurrences of the query term, the occurrences comprising at least one occurrence of the query term together with at least one of the off-topic terms in the context of the query term;
   classifying the at least one occurrence of the query term as non-relevant to the topic responsively to the occurrence of the at least one of the off-topic terms in the context of the query term; and
   returning at least one relevant occurrence of the query term to a user.

2. The method according to claim 1, wherein each of the adjunct terms belongs to a term type selected from a group of term types consisting of words, phrases and lexical affinities.

3. The method according to claim 1, wherein the adjunct terms further comprise one or more on-topic terms, and wherein finding the occurrences of the query term comprises finding at least one of the adjunct terms in the context of each of at least some of the occurrences of the query term, and wherein classifying the at least one occurrence of the query term comprises classifying each of the at least some of the occurrences of the query term as relevant or non-relevant to the topic responsively to the adjunct terms found in the context of the query term.

4. The method according to claim 3, wherein specifying the query term comprises specifying multiple query terms associated with the topic, and wherein defining the adjunct terms comprises defining a generic adjunct term, for use in classifying the occurrences of any of the query terms as relevant or non-relevant to the topic, and defining a specific adjunct term, for use in classifying the occurrences of a first query term but not a second query term among the multiple query terms as relevant or non-relevant to the topic.

5. The method according to claim 3, wherein classifying each of the at least some of the occurrences of the query term comprises computing a score based on the occurrences of the on-topic and off-topic terms in the context of the query term, and comparing the score to a threshold.

6. The method according to claim 5, wherein defining the adjunct terms comprises assigning a weight to each of the adjunct terms, such that the on-topic and off-topic terms receive respective weights of opposite sign, and wherein computing the score comprises summing the weights of the adjunct terms occurring in the context.

7. The method according to claim 3, wherein defining the adjunct terms comprises defining at least one of the on-topic terms as an always-on term, such that when the always-on term is found in the context of one of the occurrences of the query term, the one of the occurrences is classified as relevant to the topic irrespective of finding any of the off-topic terms in the context.

8. The method according to claim 3, wherein defining the adjunct terms comprises defining at least one of the off-topic terms as an always-off term, such that when the always-off term is found in the context of one of the occurrences of the query term, the one of the occurrences is classified as non-relevant to the topic irrespective of finding any of the on-topic terms in the context.

9. The method according to claim 1, wherein defining the adjunct terms comprises at least one of:
receiving a list of the adjunct terms from a user; and
processing the corpus to find one or more documents of relevance to the topic, and analyzing the one or more documents to extract the adjunct terms therefrom.

10. The method according to claim 1, wherein the corpus of data comprises a collection of documents, which are interconnected by hyperlinks, and wherein finding the occurrences of the query term comprises crawling over the hyperlinks to assemble a set of the documents, and searching the set to find the occurrences.

11. The method according to claim 10, wherein searching the set comprises finding a first document in the set containing one of the occurrences of the query term, and wherein crawling over the hyperlinks comprises identifying in the corpus one or more second documents containing the hyperlinks leading to the first document, determining that the second documents are non-relevant to the topic, and responsively to determining that the one or more second documents are non-relevant to the topic, classifying the one of the occurrences of the query term as non-relevant to the topic.

12. The method according to claim 10, wherein the documents comprise Web pages, and wherein crawling over the hyperlinks comprises collecting the Web pages from multiple computers over a network.

13. The method according to claim 1, wherein finding the occurrences comprises finding a first set of the adjunct terms in an extended context of the query term, and finding a second set of the adjunct terms in a local context of the query term, such that the extended context contains the local context, and wherein classifying the at least one occurrence comprises evaluating the first set of the adjunct terms in order to determine a first measure of relevance of the at least one occurrence of the query term to the topic, and evaluating the second set of the adjunct terms in order to determine a second measure of the relevance of the at least one occurrence of the query term to the topic, and classifying the occurrence of the query term as relevant or non-relevant to the topic responsively to the first and second measures.

14. A method for extracting information from a corpus of data, comprising:
specifying a topic and a query term associated with the topic;
finding in the corpus a first document containing an occurrence of the query term;
identifying in the corpus one or more second documents containing hyperlinks leading to the first document;
evaluating the one or more second documents to determine whether the second documents are relevant or non-relevant to the topic;
responsively to determining that the one or more second documents are non-relevant to the topic, classifying the occurrence of the query term in the first document as non-relevant to the topic; and
returning at least one relevant occurrence of the query term to a user.

15. The method according to claim 14, wherein finding the first document and the one or more second documents comprises crawling over the hyperlinks in order to assemble a set of the documents in the corpus that are related to the topic.

16. The method according to claim 15, wherein the documents comprise Web pages, and wherein crawling over the hyperlinks comprises collecting the Web pages from multiple computers over a network.

17. A method for extracting information from a corpus of data, comprising:
specifying a topic and a query term associated with the topic;
finding in the corpus an occurrence of the query term;
evaluating an extended context of the occurrence of the query term in order to determine a first measure of relevance of the occurrence of the query term to the topic;
evaluating a local context of the occurrence of the query term, such that the local context is contained within the extended context, in order to determine a second measure of the relevance of the occurrence of the query term to the topic;
classifying the occurrence of the query term as relevant or non-relevant to the topic responsively to the first and second measures; and
returning at least one relevant occurrence of the query term to a user.

18. The method according to claim 17, and comprising defining adjunct terms that may occur in the corpus in proximity to the query term, wherein evaluating the extended context comprises identifying a first set of the adjunct terms occurring in the extended context of the occurrence of the query term, and determining the first measure based on the first set, and wherein evaluating the local context comprises identifying a second set of the adjunct terms occurring in the local context of the occurrence of the query term, and determining the second measure based on the second set.

19. The method according to claim 18, wherein each of the adjunct terms belongs to a term type selected from a group of term types consisting of words, phrases and lexical affinities.

20. The method according to claim 18, wherein specifying the query term comprises specifying multiple query terms associated with the topic, and wherein defining the adjunct terms comprises defining a generic adjunct term, for use in classifying the occurrences of any of the query terms as relevant or non-relevant to the topic, and defining a specific adjunct term, for use in classifying the occurrences of a first query term but not a second query term among the multiple query terms as relevant or non-relevant to the topic.

21. The method according to claim 18, wherein evaluating the extended context comprises computing a first score based on the first set of the adjunct terms, wherein evaluating the local context comprises computing a second score based on the second set of the adjunct terms, and wherein classifying the occurrence comprises comparing the first and second scores to a threshold.

22. The method according to claim 21, wherein comparing the first and second scores comprises comparing a weighted sum of the first and second scores to the threshold.

23. The method according to claim 21, wherein defining the adjunct terms comprises defining on-topic and off-topic terms, and assigning a weight to each of the adjunct terms such that the on-topic and off-topic terms receive respective weights of opposite sign, and wherein computing the global and local scores comprises summing the weights of the adjunct terms occurring in the first and second sets of the adjunct terms, respectively.

24. The method according to claim 17, wherein the corpus of data comprises a collection of documents, which are interconnected by hyperlinks, and wherein finding the occurrence of the query term comprises crawling over the hyperlinks to assemble a set of the documents, and searching the set to find the occurrence.

25. The method according to claim 24, wherein searching the set comprises finding the occurrence in a first document in the set, and wherein crawling over the hyperlinks comprises identifying in the corpus one or more second documents containing the hyperlinks leading to the first document, determining that the second documents are non-relevant to the topic, and responsively to determining that the one or more second documents are non-relevant to the topic, classifying the occurrence of the query term as non-relevant to the topic.

26. The method according to claim 24, wherein the documents comprise Web pages, and wherein crawling over the hyperlinks comprises collecting the Web pages from multiple computers over a network.

27. The method according to claim 17, wherein the extended context comprises a page of a document in the corpus, and wherein the local context comprises a passage of text within the page.

28. The method according to claim 17, and comprising evaluating a global context of the occurrence of the query term in order to determine a third measure of the relevance of the occurrence of the query term to the topic, such that the extended context is contained within the global context, and wherein classifying the occurrence comprises classifying the occurrence of the query term responsively to the third measure, together with the first and second measures.

29. A method for extracting information from a corpus of data, comprising:

specifying a topic and multiple query terms associated with the topic, including at least first and second query terms;

defining adjunct terms which may occur in the corpus in a context of one or more of the query terms, the adjunct terms comprising:

one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic;

finding in the corpus occurrences of the query terms, the occurrences comprising at least one occurrence of one of the query terms together with at least one of the adjunct terms in the context of the one of the query terms; and classifying the at least one occurrence as relevant or non-relevant to the topic responsively to the occurrence of the at least one of the adjunct terms in the context of the one of the query terms; and returning at least one relevant occurrence of the query term to a user.

30. The method according to claim 29, wherein each of the adjunct terms belongs to a term type selected from a group of term types consisting of words, phrases and lexical affinities.

31. The method according to claim 29, wherein classifying the at least one occurrence comprises computing a score based on the occurrence of at least one of the generic adjunct terms in the context of either of the first and second query term, and comparing the score to a threshold.

32. The method according to claim 31, wherein computing the score comprises computing a first score based further on the occurrence of at least one of the specific adjunct terms in the context of the first query term, while ignoring the occurrence of the specific adjunct terms in computing a second score with respect to the second query term.

33. Apparatus for extracting information from a corpus of data for information relevant to a topic, using a specified query term associated with the topic, the apparatus comprising:

a memory, which is arranged to store at least a portion of the corpus and a set of adjunct terms which may occur in the corpus in a context of the query term, the adjunct terms comprising one or more off-topic terms; and a data mining processor, which is arranged to search the memory in order to find occurrences of the query term, the occurrences comprising at least one occurrence of the query term together with at least one of the off-topic terms in the context of the query term, and to classify the at least one occurrence of the query term as non-relevant to the topic responsively to the occurrence of the at least one of the off-topic terms in the context of the query term, so as to cause at least one relevant occurrence of the query term to be returned to a user.

34. The apparatus according to claim 33, wherein each of the adjunct terms belongs to a term type selected from a group of term types consisting of words, phrases and lexical affinities.

35. The apparatus according to claim 33, wherein the adjunct terms further comprise one or more on-topic terms, and wherein the processor is arranged to find at least one of the adjunct terms in the context of each of at least some of the occurrences of the query term, and to classify each of the at least some of the occurrences of the query term as relevant or non-relevant to the topic responsively to the adjunct terms found in the context of the query term.

36. The apparatus according to claim 33, wherein the processor is arranged to process the corpus to find one or more documents of relevance to the topic, and to analyze the one or more documents to extract the adjunct terms therefrom.

37. The apparatus according to claim 33, wherein the corpus of data comprises a collection of documents, which are interconnected by hyperlinks, and wherein the occurrences of the query term are found by crawling over the hyperlinks to assemble a set of the documents, and searching the set to find the occurrences.

38. The apparatus according to claim 33, wherein the processor is arranged to find a first set of the adjunct terms in an extended context of the query term, and to find a second set of the adjunct terms in a local context of the query term, such that the extended context contains the local context, and
    wherein the processor is arranged to evaluate the first set of the adjunct terms in order to determine a first measure of relevance of the at least one occurrence of the query term to the topic, and to evaluate the second set of the adjunct terms in order to determine a second measure of the relevance of the at least one occurrence of the query term to the topic, and to classify the occurrence of the query term as relevant or non-relevant to the topic responsively to the first and second measures.

39. Apparatus for extracting information from a corpus of data for information relevant to a topic, using a specified query term associated with the topic, the apparatus comprising:
    a memory, which is arranged to store at least a portion of the corpus; and
    a data mining processor, which is arranged to search the memory in order to find in the corpus a first document containing an occurrence of the query term, and to identify in the corpus one or more second documents containing hyperlinks leading to the first document, the processor being further arranged to evaluate the one or more second documents to determine whether the second documents are relevant or non-relevant to the topic, and responsively to determining that the one or more second documents are non-relevant to the topic, to classify the occurrence of the query term in the first document as non-relevant to the topic, so as to cause at least one relevant occurrence of the query term to be returned to a user.

40. The apparatus according to claim 39, wherein the processor is arranged to find the first document and the one or more second documents by crawling over the hyperlinks in order to assemble a set of the documents in the corpus that are related to the topic.

41. The apparatus according to claim 39, wherein the documents comprise Web pages, and wherein the processor is arranged to collect the Web pages from multiple computers over a network.

42. Apparatus for extracting information from a corpus of data for information relevant to a topic, using a specified query term associated with the topic, the apparatus comprising:
    a memory, which is arranged to store at least a portion of the corpus; and
    a data mining processor, which is arranged to search the memory in order to find in the corpus an occurrence of the query term, and which is further arranged to evaluate an extended context of the occurrence of the query term in order to determine a first measure of relevance of the occurrence of the query term to the topic, and to evaluate a local context of the occurrence of the query term, such that the local context is contained within the extended context, in order to determine a second measure of the relevance of the occurrence of the query term to the topic, and to classify the occurrence of the query term as relevant or non-relevant to the topic responsively to the first and second measures, so as to cause at least one relevant occurrence of the query term to be returned to a user.

43. The apparatus according to claim 42, wherein the memory is further arranged to store adjunct terms that may occur in the corpus in proximity to the query term, and
    wherein the processor is arranged to identify a first set of the adjunct terms occurring in the extended context of the occurrence of the query term, and to determine the first measure based on the first set, and to identify a second set of the adjunct terms occurring in the local context of the occurrence of the query term, and to determine the second measure based on the second set.

44. The apparatus according to claim 42, wherein the corpus of data comprises a collection of documents, which are interconnected by hyperlinks, and wherein the occurrences of the query term are found by crawling over the hyperlinks to assemble a set of the documents, and searching the set to find the occurrences.

45. The apparatus according to claim 42, wherein the extended context comprises a page of a document in the corpus, and wherein the local context comprises a passage of text within the page.

46. The apparatus according to claim 42, and wherein the processor is further arranged to evaluate a global context of the occurrence of the query term in order to determine a third measure of the relevance of the occurrence of the query term to the topic, such that the extended context is contained within the global context, and to classify the occurrence of the query term responsively to the third measure, together with the first and second measures.

47. Apparatus for extracting information from a corpus of data for information relevant to a topic, using specified query terms associated with the topic, including at least first and second query terms, the apparatus comprising:
    a memory, which is arranged to store at least a portion of the corpus and a set of adjunct terms which may occur in the corpus in a context of one or more of the query terms, the adjunct terms comprising:
        one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic; and a data mining processor, which is arranged to search the memory in order to find occurrences of the query terms, the occurrences comprising at least one occurrence of one of the query terms together with at least one of the adjunct terms in the context of the one of the query terms, and to classify the at least one occurrence as relevant or non-relevant to the topic responsively to the occurrence of the at least one of the adjunct terms in the context of the one of the query terms, so as to cause at least one relevant occurrence of the query term to be returned to a user.

48. The apparatus according to claim 47, wherein each of the adjunct terms belongs to a term type selected from a group of term types consisting of words, phrases and lexical affinities.

49. The apparatus according to claim 47, wherein the processor is arranged to classify the at least one occurrence by computing a score based on the occurrence of at least one of the generic adjunct terms in the context of either of the first and second query term, and comparing the score to a threshold.

50. A computer software product for extracting information from a corpus of data for information relevant to a topic, using a specified query term associated with the topic, the product comprising a computer-readable medium in which program instructions are stored, which instructions, when read by a computer, cause the computer to receive a set of adjunct terms which may occur in the corpus in a context of the query term, the adjunct terms comprising one or more off-topic terms, and to search the data in order to find occurrences of the query term, the occurrences comprising at least one occurrence of the query term together with at least one of the off-topic terms in the context of the query term, and to classify the at least one occurrence of the query term as non-relevant to the topic responsively to the occurrence of the at least one of the off-topic terms in the context of the query term, so as to cause at least one relevant occurrence of the query term to be returned to a user.

51. The product according to claim 50, wherein each of the adjunct terms belongs to a term type selected from a group of term types consisting of words, phrases and lexical affinities.

52. The product according to claim 50, wherein the adjunct terms further comprise one or more on-topic terms, and wherein the instructions cause the computer to find at least one of the adjunct terms in the context of each of at least some of the occurrences of the query term, and to classify each of the at least some of the occurrences of the query term as relevant or non-relevant to the topic responsively to the adjunct terms found in the context of the query term.

53. The product according to claim 50, wherein the instructions cause the computer to process the corpus to find one or more documents of relevance to the topic, and to analyze the one or more documents to extract the adjunct terms therefrom.

54. The product according to claim 50, wherein the corpus of data comprises a collection of documents, which are interconnected by hyperlinks, and wherein the occurrences of the query term are found by crawling over the hyperlinks to assemble a set of the documents, and searching the set to find the occurrences.

55. The product according to claim 50, wherein the instructions cause the computer to find a first set of the adjunct terms in an extended context of the query term, and to find a second set of the adjunct terms in a local context of the query term, such that the extended context contains the local context, and wherein the instructions further cause the computer to evaluate the first set of the adjunct terms in order to determine a first measure of relevance of the at least one occurrence of the query term to the topic, and to evaluate the second set of the adjunct terms in order to determine a second measure of the relevance of the at least one occurrence of the query term to the topic, and to classify the occurrence of the query term as relevant or non-relevant to the topic responsively to the first and second measures.

56. A computer software product for extracting information from a corpus of data for information relevant to a topic, using a specified query term associated with the topic, the product comprising a computer-readable medium in which program instructions are stored, which instructions, when read by a computer, cause the computer to search the data in order to find in the corpus a first document containing an occurrence of the query term, and to identify in the corpus one or more second documents containing hyperlinks leading to the first document, the instructions further causing the computer to evaluate the one or more second documents to determine whether the second documents are relevant or non-relevant to the topic, and responsively to determining that the one or more second documents are non-relevant to the topic, to classify the occurrence of the query term in the first document as non-relevant to the topic, so as to cause at least one relevant occurrence of the query term to be returned to a user.

57. The product according to claim 56, wherein the instructions cause the computer to find the first document and the one or more second documents by crawling over the hyperlinks in order to assemble a set of the documents in the corpus that are related to the topic.

58. The product according to claim 56, wherein the documents comprise Web pages, and wherein the instructions cause the computer to collect the Web pages from multiple computers over a network.

59. A computer software product for extracting information from a corpus of data for information relevant to a topic, using a specified query term associated with the topic, the product comprising a computer-readable medium in which program instructions are stored, which instructions, when read by a computer, cause the computer to search the data in order to find in the corpus an occurrence of the query term, and further cause the computer to evaluate an extended context of the occurrence of the query term in order to determine a first measure of relevance of the occurrence of the query term to the topic, and to evaluate a local context of the occurrence of the query term, such that the local context is contained within the extended context, in order to determine a second measure of the relevance of the occurrence of the query term to the topic, and to classify the occurrence of the query term as relevant or non-relevant to the topic responsively to the first and second measures, so as to cause at least one relevant occurrence of the query term to be returned to a user.

60. The product according to claim 59, wherein the instructions cause the computer to receive adjunct terms that may occur in the corpus in proximity to the query term, and to identify a first set of the adjunct terms occurring in the extended context of the occurrence of the query term, so as to determine the first measure based on the first set, and to identify a second set of the adjunct terms occurring in the local context of the occurrence of the query term, so as to determine the second measure based on the second set.

61. The product according to claim 59, wherein the extended context comprises a page of a document in the corpus, and wherein the local context comprises a passage of text within the page.

62. The product according to claim 59, and wherein the instructions further cause the computer to evaluate a global context of the occurrence of the query term in order to determine a third measure of the relevance of the occurrence of the query term to the topic, such that the extended context is contained within the global context, and to classify the occurrence of the query term responsively to the third measure, together with the first and second measures.

63. A computer software product for extracting information from a corpus of data for information relevant to a topic, using specified query terms associated with the topic, including at least first and second query terms, the product comprising a computer-readable medium in which program instructions are stored, which instructions, when read by a computer, cause the computer to receive a set of adjunct terms which may occur in the corpus in a context of one or more of the query terms, the adjunct terms comprising:

one or more generic adjunct terms, for use in classifying the occurrences of any of the query terms as relevant or non-relevant to the topic; and one or more specific adjunct terms, for use in classifying the occurrences of the first query term but not the second query term as relevant or non-relevant to the topic, wherein the instructions further cause the computer to search the memory in order to find occurrences of the query terms, the occurrences comprising at least one occurrence of one of the query terms together with at least one of the adjunct terms in the context of the one of the query terms, and to classify the at least one occurrence as relevant or non-relevant to the topic responsively to the occurrence of the at least one of the adjunct terms in the context of the one of the query terms, so as to cause at least one relevant occurrence of the query term to be returned to a user.

64. The product according to claim 63, wherein each of the adjunct terms belongs to a term type selected from a group of term types consisting of words, phrases and lexical affinities.

65. The product according to claim 63, wherein the instructions cause the computer to classify the at least one occurrence by computing a score based on the occurrence of at least one of the generic adjunct terms in the context of either of the first and second query term, and comparing the score to a threshold.

* * * * *